(12) United States Patent
Gordon et al.

(10) Patent No.: US 6,768,541 B2
(45) Date of Patent: Jul. 27, 2004

(54) CHROMATIC DISPERSION MEASUREMENT

(75) Inventors: James Power Gordon, Rumson, NJ (US); Robert Meachem Jopson, Rumson, NJ (US); Herwig Werner Kogelnik, Rumson, NJ (US); Lynn E. Nelson, Monmouth Beach, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/306,264

(22) Filed: Nov. 27, 2002

(65) Prior Publication Data

US 2003/0112424 A1 Jun. 19, 2003

Related U.S. Application Data

(63) Continuation-in-part of application No. 09/520,537, filed on Mar. 8, 2000, now Pat. No. 6,519,027.

(51) Int. Cl.$^7$ .............................................. G01N 21/00
(52) U.S. Cl. .................................................. 356/73.1
(58) Field of Search ................. 356/73.1; 398/141–148, 398/192, 119, 29, 81; 385/142–144, 123–127, 37, 12; 250/227.14, 227.12; 359/124–135, 110, 140, 484, 136, 341, 161, 187, 167, 496, 117, 173–177

(56) References Cited

U.S. PATENT DOCUMENTS 5,724,126 A * 3/1998 Nishi et al. ................. 356/73.1
6,501,580 B1 * 12/2002 Ishikawa et al. ............ 398/148

* cited by examiner

*Primary Examiner*—Tu T. Nguyen
(74) *Attorney, Agent, or Firm*—James Milton

(57) ABSTRACT

In one method, two light signals, of the same optical frequency, but having orthogonal states of polarization, are transmitted through an optical device and the mean signal delay of each of the light signals is measured. Calculations, based upon disclosed relationships, provide the polarization-independent delay ($\tau_0$) through the optical device based upon the mean signal delays ($\tau_{g1}$ and $\tau_{g(-1)}$) of each of the light signals. By comparing $\tau_0$ at adjacent wavelengths, the chromatic dispersion of the optical device can be accurately measured even in the presence of PMD. In a second, similar method, four light signals of non-degenerate polarizations states that span Stokes space are utilized. In a modification of the above-described methods based on the measurement of pulse delays, the methods are adapted to the measurement of phase delays of sinusoidally modulated signals.

8 Claims, 3 Drawing Sheets

CHROMATIC DISPERSION MEASUREMENT

This application is a continuation in part of application Ser. No. 09/520,537, filed Mar. 8, 2000, now U.S. Pat. No. 6,519,027 issued Feb. 11, 2003, the subject matter of which is incorporated herein by reference.

BACKGROUND OF THE INVENTION

This invention relates to optical measurements, and particularly to the measurement of the chromatic dispersion of optical devices, particularly optical fibers used in telecommunication networks.

Chromatic dispersion is the difference in time delay that different frequencies (wavelengths) experience when being transmitted through an optical component or optical fiber. This phenomenon is caused by the frequency-dependence of the refractive index (n) of the material and the waveguide dispersion, which is related to the design of the optical fiber. Polarization mode dispersion (PMD) is the polarization-dependence of the time delay through an optical component or an optical fiber. Polarization mode dispersion and chromatic dispersion are related, in that they both reflect time delays through an optical fiber component. PMD is discussed first.

PMD is a distortion mechanism (like chromatic dispersion) that causes optical devices, such as single-mode fibers, optical switches and optical isolators, to distort transmitted light signals. The relative severity of PMD (which is a function of the wavelength of the transmitted light) has increased as techniques for dealing with chromatic dispersion have improved, transmission distances have increased, and bit rates have increased. Negative effects of PMD appear as random signal fading, increased composite second order distortion and increased error rates.

PMD is due to differential group delay caused by geometrical irregularities and other sources of birefringence in the transmission path of the optical device. For example, a single-mode fiber (SMF) is ideally a homogeneous medium supporting only one mode. In practice, it supports two propagation modes with orthogonal polarizations. When a lightwave source transmits a pulse into a SMF cable, the pulse energy is resolved onto the principal states of polarization of the fiber. The two groups of pulse energy propagate at different velocities and arrive at different times causing pulse broadening and signal distortion.

The PMD of a fiber is commonly characterized by two specific orthogonal states of polarization called the principal states of polarization (PSPs) and the differential group delay (DGD) between them. This can be described at an optical angular frequency, $\omega$, by the 3-component Stokes vector, $\vec{\Omega} = \Delta\tau \vec{q}$, where $\vec{q}$ is a unit Stokes vector pointing in the direction of the faster PSP, and the magnitude, $\Delta\tau$, is the DGD. Typical DGD values encountered in transmission systems range between 1 (picosecond) ps and 100 ps.

Known methods for determining PMD vectors include the Jones Matrix Eigenanalysis (JME) technique and the Müller Matrix Method (MMM). Each of these techniques uses a tunable, continuous-wave laser and a polarimeter to measure the output polarization states for two (or three) different input polarization launches at two optical frequencies. The PMD vector is then calculated for the midpoint frequency. In addition to determining the output PMD vector, the Müller Matrix Method determines the rotation matrix of the fiber at each frequency and thus the input PMD vector can be calculated.

Measurements of chromatic dispersion of optical components, spooled fiber, or installed fiber are important for predicting how severe the pulse distortion (and associated penalties) will be after transmission through the optical element(s). Chromatic dispersion is often measured with the modulation phase-shift method (B. Costa, et al., Journal of Quantum Electronics, Vol. 18, pp. 1509–1515, 1982). In this method, light from a tunable laser is modulated (usually with a sine wave at 1 to 3 MHz frequency) and launched into the optical element. The mean signal delay at the output of the optical element is measured using a network analyzer by referencing to the input. By measuring the delays for two frequencies, the chromatic dispersion at the average of the two frequencies can be obtained by dividing the change in delay by the change in frequency. The modulation phase-shift method is conventionally employed without control of the polarization of the signals launched into the optical element. For an element with no PMD, not controlling the input polarizations does not change the time delays measured or the calculated chromatic dispersion. But for birefringent elements or elements with PMD, the mean signal delays measured at the output will depend on the launched polarization of the signals. Therefore, the chromatic dispersion and the PMD both contribute to the time delay and cannot be easily separated.

The invention disclosed in this application details a method for accurately measuring the chromatic dispersion of an optical device in the presence of PMD. The chromatic dispersion measured is the intrinsic or polarization-averaged chromatic dispersion. Other known methods for measuring chromatic dispersion tend to give inaccurate results if the devices have PMD.

SUMMARY OF THE INVENTION

At the input of an optical device, typically an optical fiber link within an optical fiber telecommunications network, two different light signals, of the same optical frequency, but having different states of polarization that are orthogonal in Stokes space, are transmitted along the fiber and the mean signal delay of each of the light signals is measured. By repeating the mean signal delay measurement at multiple optical frequencies (i.e., at a different optical frequency for each set of time delay measurements), determination can be made of the first and higher-order intrinsic (polarization-averaged) chromatic dispersion of the device being measured. A method involving launching four test signals is also disclosed, where the launch polarizations are not required to be orthogonal.

DESCRIPTION OF PREFERRED EMBODIMENTS

Preliminary Discussion of PMD Measurements

Figure 1:
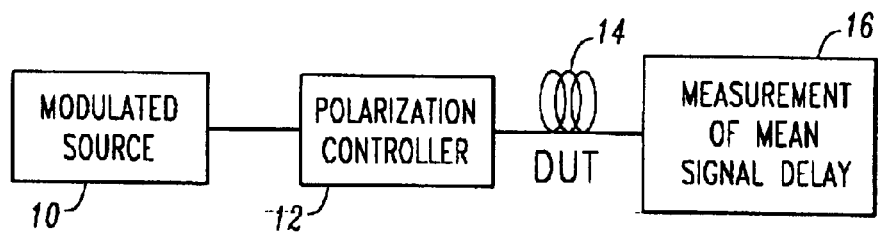
FIG. 1 is a schematic illustration of a system for implementing the present invention.

As above-described, PMD is usually (and herein) described as a three dimensional vector having a magnitude and direction, i.e., having three components. Both an input and an output PMD vector can be determined for any optical device. The PMD vectors are a function of the wavelength of the light transmitted through the device. A method for making measurements of an optical device and determining the three components of the various PMD vectors is first described. The measurement and calculations made are based upon the known (Mollenauer, L. F. and Gordon, J. P., Optics Lett., Vol. 19, pp. 375–377, 1994) relationship, $$\tau_g = \tau_0 - \frac{1}{2}\vec{s}\cdot\vec{\Omega} \qquad (1)$$

where $\vec{s}$ and $\vec{\Omega}$ are, respectively, the normalized Stokes vectors of the light and the (unnormalized) PMD vector at the fiber input. Equation (1) describes the polarization dependence of the mean signal delay, $\tau_g$, through the fiber as defined by the first moment of the pulse envelope in the time domain with $\tau_0$ being a polarization averaged or common group delay component. Eq. (1) assumes that $\tau_0$ and $\vec{\Omega}(\omega)$ do not vary significantly over the bandwidth of the signal. The (polarization-averaged) chromatic dispersion can be determined by the frequency dependence of $\tau_0$.

The definition of mean signal delays involving "moments" of the output signals is known and described, for example, in the afore-cited publication by Mollenauer and Gordon as well as by Elbers, J. P., et al, "Modeling of Polarization Mode Dispersion in Single Mode Fibers," Electr. Lett., Vol. 33, pp. 1894–1895, October 97; Shieh, W., "Principal States of Polarization for an Optical Pulse," IEEE Photon. Technol. Lett; Vol. 11, No. 6, p. 677, June 99; and Karlsson, M., "Polarization Mode Dispersion-Induced Pulse Broadening in Optical Fibers," Opt. Lett., Vol. 23, pp. 688–690, '98.

More precisely, mean signal delay, $\tau_g$, is expressed as the difference of the normalized first moments at fiber output and input, $$\tau_g = \frac{W_1(z) - W_1(0)}{W}, \qquad (2)$$

where z is the distance of propagation in the fiber. Here $W = \int dt\, \vec{E}^\dagger \vec{E} = \int d\omega\, \tilde{E}^\dagger \tilde{E}$ is the energy of the signal pulse represented by the complex field vector $\vec{E}(z,t)$ with Fourier transform $\tilde{E}(z,\omega)$, and $W_1(z) = \int dt\, t\, \vec{E}^\dagger \vec{E} = j \int d\omega\, \tilde{E}^\dagger \tilde{E}_\omega$ is the first moment.

Because, in equation (1), there are four unknowns, i.e., $\tau_0$ (fiber intrinsic or common group delay) and the three components of the PMD input vector, $\vec{\Omega}$, four measurements are necessary to determine $\vec{\Omega}$ and $\tau_0$ at a given wavelength. Each set of measurements comprises launching a set of four light signals of respectively different polarization states into the fiber and measuring the mean signal delay of each of the signals by known means.

A variety of different light polarization states can be used, but for simplicity of the mathematical analysis, a convenient set of polarization states are those coinciding with the Poincaré sphere axes, $\hat{S}_1$, $\hat{S}_{-1}$, $\hat{S}_2$, and $\hat{S}_3$, i.e., three different linear polarization states (where $\hat{S}_1$ and $\hat{S}_{-1}$ are orthogonal polarization states) and a circular polarization state. (A "Poincaré sphere" being a graphical representation of all possible polarization states on a surface of a sphere where each point on the sphere represents a different polarization form; see, for example, W. Shurcliff, *Polarized Light: Production and Use*, p. 16, Harvard University Press, Cambridge, Mass., 1962. A specific example of selected polarization states is provided hereinafter.)

By identifying the measured mean signal delays for each polarized state as $\tau_{g1}$, $\tau_{g(-1)}$, $\tau_{g2}$, and $\tau_{g3}$ respectively, the calculated components from equation (1) are as follows:

$$\tau_0 = \frac{1}{2}(\tau_{g1} + \tau_{g(-1)}) \qquad (3)$$

and the three components of the fiber input PMD Stokes vector $\vec{\Omega}$ are:

$$\Omega_1 = 2(\tau_0 - \tau_{g1})$$
$$\Omega_2 = 2(\tau_0 - \tau_{g2})$$
$$\Omega_3 = 2(\tau_0 - \tau_{g3}) \qquad (4)$$

Here, $\tau_0$ is determined directly from the measured mean signal delays of the two orthogonally polarized test light signals (e.g., $\hat{S}_1$ and $\hat{S}_{-1}$). Described hereinafter is how the above mathematical relationships, for the "special" Poincaré sphere axial polarizations, can be generalized to any four non-degenerate input polarization states. Also described hereinafter is how, from the measurement of $\tau_0$ at different optical frequencies, chromatic dispersion is determined.

The basic measuring technique is illustrated in FIG. 1, which shows a test system including a source 10 of modulated light at a single optical frequency and a polarization controller 12 for adjusting the polarization of the light from the source 10 to successively different polarization states, which are successively introduced into and transmitted through an optical device 14 under test, e.g., a length of optical fiber wound on a coil. The light signals exiting the test device 14 are successively fed into an apparatus 16 for measuring the mean signal delay for each test signal transmitted through the device. The measured data provides, by equation (3) (using orthogonally polarized test signals), the polarization-averaged delay, and, by equation 4, using four test signals, the input PMD Stokes vector of the device under test at a single optical frequency. The measurements are repeated at successively different optical frequencies for determining the frequency dependence of these factors. Also, the data taken at multiple frequencies allows the determination of the chromatic dispersion of the device under test. This is described hereinafter.

Figure 2:
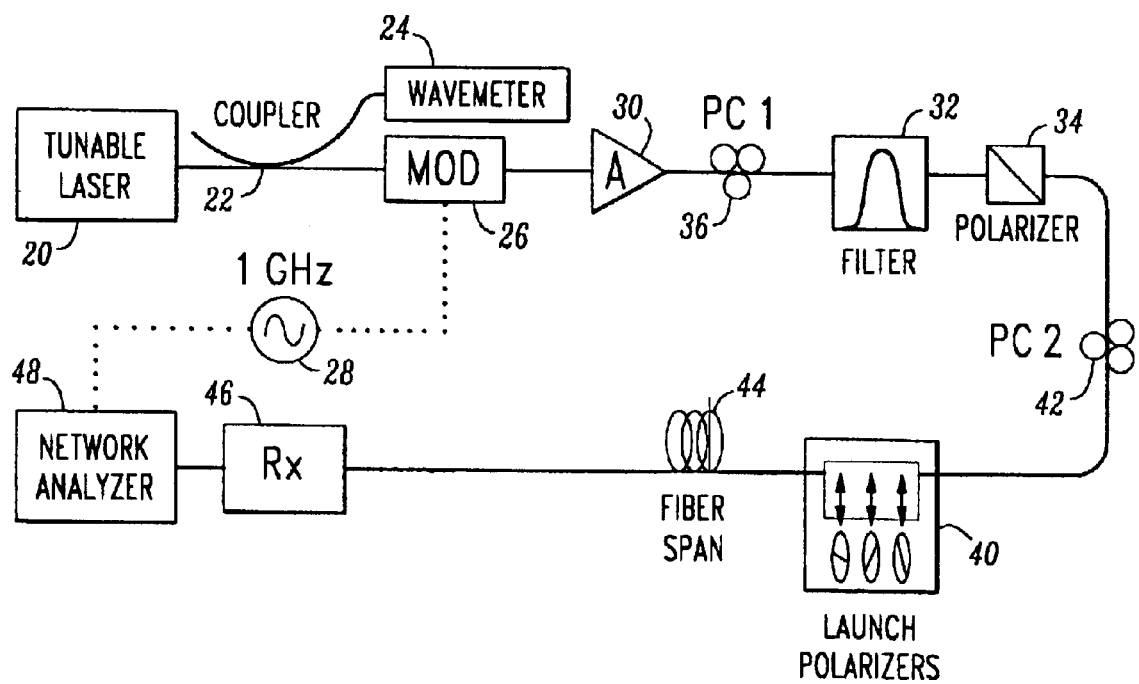
FIG. 2 is similar to FIG. 1 but showing a more specific example of a suitable system for implementing the invention.

Apparatus for performing each of the functions indicated in FIG. 1 are generally known, and different specific arrangements can be devised by persons of skill. FIG. 2 shows one such arrangement.

Light of a desired wavelength is provided by a wavelength tunable laser 20 (Hewlett-Packard 81682A). A directional coupler 22 (Etek SWBC2201PL213) splits the light from the laser into two parts, one of which enters a wavemeter 24 (Hewlett-Packard 86120B) that measures the wavelength of the light, the other of which is coupled to an optical modulator (MOD) 26 (Lucent Technologies X2623C). An electrical signal from an oscillator 28 (1 GHz) (part of Hewlett-Packard 83420A) is also connected to the modulator. The optical modulator imposes a sinusoidal modulation on the optical power of the light. This modulated signal is amplified by an optical amplifier (A) 30 (Lucent Technologies W1724CDDAD), passed through a tunable optical filter 32 (JDS Fitel TB1500B) tuned to the wavelength of the signal and enters a linear polarizer 34 (Etek FPPD2171LUC02). A polarization controller (PC1) 36

(Fiber Control Industries FPC-1) is used to adjust the polarization of the signal so that it nearly matches the polarization of the linear polarizer 34. This polarizer 34, which is not essential to the measurement, serves to make the results of the measurement insensitive to polarization changes occurring in the components and in the fiber preceding the polarizer. After the polarizer 34, the signal passes though a launch polarizer box 40. This box 40, which functions by switching polarizers into or out of the signal path, selectively modifies the signal polarization from its input polarization to one of four output polarization states.

Three of those states are provided by putting an appropriate polarizer in the beam path while the fourth state is provided by switching all of the polarizers out of the beam path and using the input signal polarization unmodified. This input polarization can be adjusted to a desired state using polarization controller (PC2) 42 (Fiber Control Industries FPC-1). Alternatively, the fourth polarization could be provided by a fourth switchable polarizer in launch polarizer box 40. After passing through the launch polarizer box 40, the signal is launched into the device under test, shown here as a fiber span 44. After the fiber span, the signal, now modified by the chromatic dispersion and PMD of the fiber span, enters a receiver 46 (part of Hewlett-Packard 83420A), which generates an electrical signal with a voltage proportional to the power in the optical signal. A network analyzer 48 (Hewlett-Packard 8753D) measures the difference between the phase of the signal provided by the oscillator 28 and the phase of the amplitude modulation of the received signal.

An example of measurements made using the apparatus shown in FIG. 2 follows. Note that the detailed math for this general case will be discussed later.

Four polarization states (linear polarization states at 0°, 60.4° and 120.6°, and a circular polarization state) were launched into a 62-km optical fiber span having a known average PMD of 35 ps and a chromatic dispersion of approximately +124 ps/nm at 1542 nm.

Figure 3:
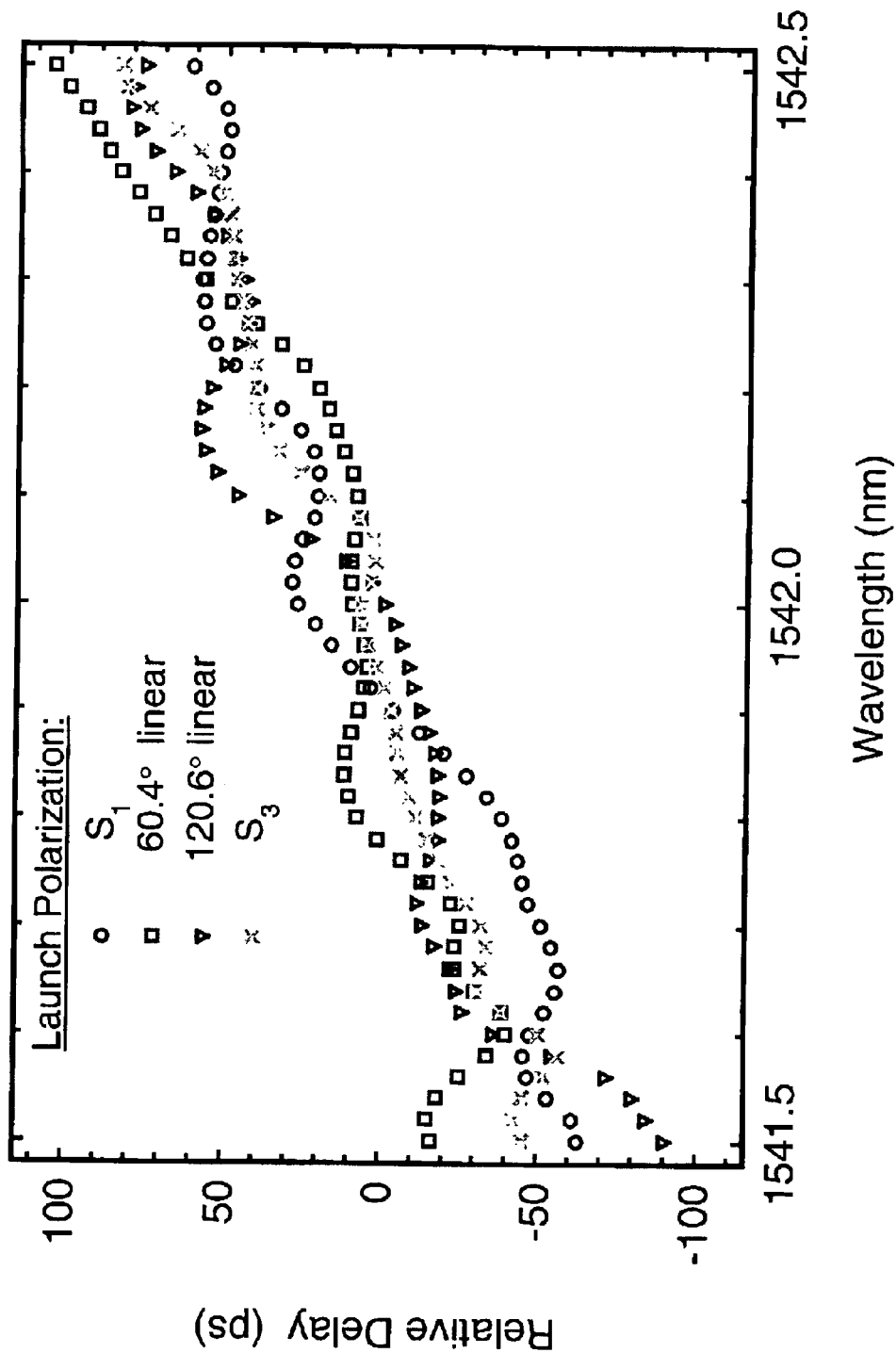
FIG. 3 is a graph showing the wavelength dependence of the signal delay of each of four fixed input polarization signals transmitted through a single mode fiber.

FIG. 3 shows the signal delays (vertical axis) for each input polarization as a function of light wavelength (horizontal axis). (Because the intrinsic signal delays through the 62-km fiber span are about 300 µs, "relative" signal delays are plotted in FIG. 3 where a constant delay has been subtracted from the actual measured delays.) The overall positive slope of the delay curves arises from the chromatic dispersion. The PMD of the fiber span causes the polarization dependence of the signal delay at each wavelength, and the variations in those relative signal delay curves originate from the change of direction and magnitude of $\vec{\Omega}(\omega)$ as well as from underlying chromatic dispersion.

Figure 4:
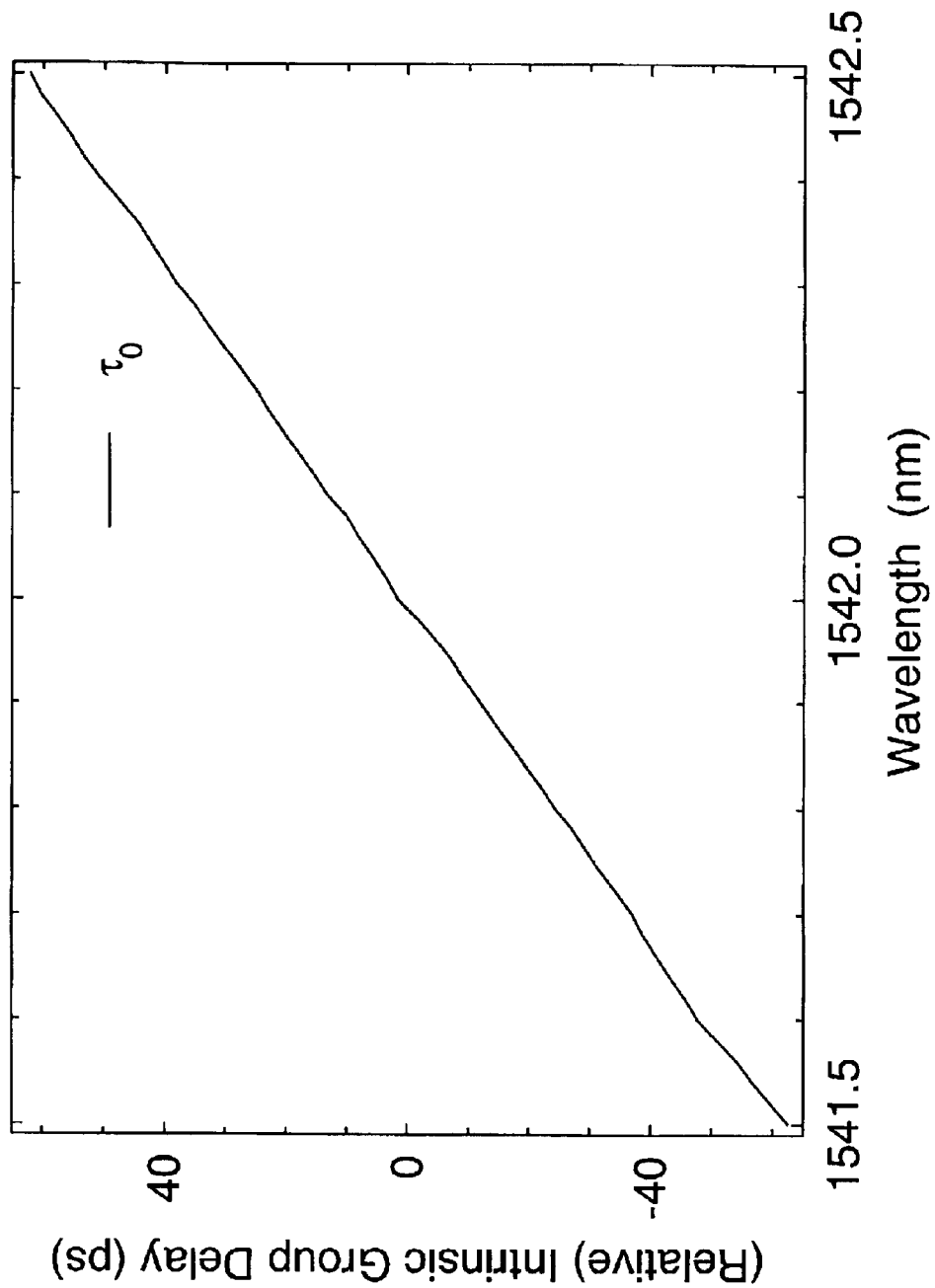
FIG. 4 is a graph showing the wavelength dependence of the intrinsic (polarization-averaged) group delay of the fiber obtained using the data of FIG. 3.

FIG. 4 shows the relative polarization-averaged delay, $\tau_0$ for this fiber, determined from the data of FIG. 3. Here, $\tau_0$ is the common, or polarization-averaged, delay through the fiber span at each wavelength compared to the delay at the center wavelength, 1542.0 nm. In order to avoid "aliasing" and accurately measure the relative delays, the modulation frequency $f_m$ must obey the condition: $f_m < (2D\Delta\lambda)^{-1}$. Here D is the dispersion of the optical element (ps/nm), and $\Delta\lambda$ is the step size between adjacent wavelengths (nm). For FIG. 3, the step size $\Delta\lambda$ was 1 nm and the fiber's dispersion D was 124 ps/nm, so the modulation frequency of 1 GHz obeyed the afore-mentioned condition.

FIG. 4 shows all the data necessary for the determination of the chromatic dispersion of the test fiber 44 (FIG. 2). Chromatic dispersion is the change in the intrinsic, or common (polarization-averaged) group delay $\tau_0$ through an optical device with wavelength. For instance, if measurements are taken at two wavelengths, $\lambda_1$ and $\lambda_2$, the chromatic dispersion D at the average of these wavelengths, $(\lambda_1+\lambda_2)/2$, can be obtained from:

$$D[(\lambda_1 + \lambda_2)/2] = \frac{\tau_0(\lambda_2) - \tau_0(\lambda_1)}{\lambda_2 - \lambda_1} \tag{5}$$

As previously described, one method, according to the present invention, for determining $\tau_0$ at a single wavelength comprises launching two polarizations that are orthogonal in Stokes space ($\hat{S}_A$ and $\hat{S}_{-A}$) and measuring the corresponding mean signal delay for each, $\tau_A$ and $\tau_{-A}$. The common group delay is then $$\tau_0 = \frac{1}{2}(\tau_A + \tau_{-A}) \tag{6}$$

A simple example (equation 3) of two orthogonal polarizations are linear polarizations with horizontal and vertical orientations, as indicated by the Stokes vectors, $\hat{S}_1$ and $\hat{S}_{(-1)}$, respectively. But, any pair of orthogonal polarizations will be sufficient.

In a more generalized method, launched are any four (known) non-degenerate input polarization launches $\vec{S}_i$ (i=1, a, b, c) that span Stokes space and measurements are made of the corresponding mean signal delays, $\tau_{g1}$, $\tau_{ga}$, $\tau_{gb}$, and $\tau_{gc}$. Using eq. 1, these mean signal delays can be expressed as $$\tau_{g1} = \tau_0 - \frac{1}{2}\vec{s}_1 \cdot \vec{\Omega} \tag{7}$$

$$\tau_{ga} = \tau_0 - \frac{1}{2}\vec{s}_a \cdot \vec{\Omega} \tag{8}$$

$$\tau_{gb} = \tau_0 - \frac{1}{2}\vec{s}_b \cdot \vec{\Omega} \tag{9}$$

$$\tau_{gc} = \tau_0 - \frac{1}{2}\vec{s}_c \cdot \vec{\Omega} \tag{10}$$

When the polarization launch $\vec{s}_1$ is chosen correctly such that there are no collinear pairs amongst $\vec{s}_a$, $\vec{s}_b$, and $\vec{s}_c$, then $\vec{s}_i$ can be expressed as a superposition, $$\vec{s}_1 = \alpha_1 \vec{s}_a + \beta_1 \vec{s}_b + \gamma_1 \vec{s}_c \tag{11}$$

where the coefficients $\alpha_1$, $\beta_1$, and $\gamma_1$ can be determined from the relations:

$$\alpha_1 = \vec{s}_1 \cdot (\vec{s}_b \times \vec{s}_c) / (\vec{s}_a \cdot (\vec{s}_b \times \vec{s}_c)) \tag{11a}$$

$$\beta_1 = \vec{s}_1 \cdot (\vec{s}_a \times \vec{s}_c) / (\vec{s}_b \cdot (\vec{s}_a \times \vec{s}_c)) \tag{11b}$$

$$\text{and } \gamma_1 = \vec{s}_1 \cdot (\vec{s}_a \times \vec{s}_b) / (\vec{s}_c \cdot (\vec{s}_a \times \vec{s}_b)) \tag{11c}$$

or from the procedure involving eq. (16) to be described later. The above relations are obtained by forming the vector dot product of eq. (11) with the appropriately chosen cross products.

A sum of eqn. (7) minus eqn. (8) times $\alpha_1$ minus eqn. (9) times $\beta_1$ minus eqn. (10) times $\gamma_1$ is taken to obtain:

$$\tau_{g1} - \alpha_1 \tau_{ga} - \beta_1 \tau_{gb} - \gamma_1 \tau_{gc} = \tau_0(1 - \alpha_1 - \beta_1 - \gamma_1) \quad (12)$$

The common group delay $\tau_0$ is then found from:

$$\tau_0 = \frac{\tau_{gl} - \alpha_1 \tau_{ga} - \beta_1 \tau_{gb} - \gamma_1 \tau_{gc}}{(1 - \alpha_1 - \beta_1 - \gamma_1)}. \quad (13)$$

Note that one way of describing that the four launch polarizations "span" Stokes space is to ensure that a tetrahedron is formed by the vertices defined by plotting the four input polarizations in (normalized) Stokes space. (In general, the larger the volume of this tetrahedron, the more accurate the measurement.) Spanning Stokes space also means that not more than two of the polarizations can be collinear (in Stokes space).

In FIG. 4, the chromatic dispersion of the fiber corresponds to the slope of the curve plotting $\tau_0$ versus wavelength. For example, at a wavelength of 1542.0 nm, the chromatic dispersion is +124 ps/nm.

As previously noted, because equation (1) contains four unknowns, four measurements are necessary. This is why, in the "more generalized method" just described, four polarization launches are used. Conversely, if orthogonal polarizations are used, as previously explained, only two launches are needed. This follows because, with orthogonal launches, the presence of PMD affects the delay of each signal by opposite, but equal amounts. That is, the deviations of the delays from $\tau_0$ for the two launched signals have equal magnitude, but one signal is advanced while the other signal is retarded.

This is seen from equation 1. When changing a launch polarization to an orthogonal polarization, the vector $\vec{s}$ in equation 1 changes sign. That is, if one launched signal has vector $\vec{s}_1$ and a second launched signal has vector $\vec{s}_2$, and if the two launches are orthogonal, then $\vec{s}_1 = -\vec{s}_2$. Thus, from equation 1, the deviations of the delays, $\tau_g$, from $\tau_0$ have equal magnitudes, but opposite signs. The PMD effects are thus cancelled in the measurements.

Instead of determining "moments" of the output signals from pulse-delay measurements, the signal delays, $\tau_{gi}$, can also be obtained (in approximation, i.e., to an acceptable degree of accuracy, e.g., 6% as described hereinafter) by observing phase shifts of the modulation of a sinusoidal amplitude modulated signal and benefiting from the precision of sensitive phase-detection techniques. (Note that Williams [Electron. Lett. Vol. 35, pp. 1578–1579, 1999] has used sinusoidal modulation for the determination of the scalar DGD [$\Delta \tau$].) For most purposes, it suffices to only measure changes in $\tau_{gi}$ with polarization and optical frequency and to not resolve the ambiguity presented by the use of a signal with periodic modulation. For a sinusoidal intensity-modulated signal with the assumption of frequency-independent PSP's and DGD, Eq. (1) becomes $$\tan \omega_m (\tau_g - \tau_0) = -\vec{q} \cdot \vec{s} \tan(\omega_m \Delta \tau / 2) \quad (14)$$

where $\omega_m$ is the angular modulation frequency. When the four launch polarizations coincide with the Poincaré sphere axes, $\vec{S}_1$, $-\vec{S}_1$, $\vec{S}_2$, and $\vec{S}_3$, Eq. (3) is still valid for sinusoidal modulation:

$$\tau_o = \frac{1}{2}(\tau_{gl} + \tau_{g(-1)}).$$

In the more general case we can use any four non-degenerate input polarization launches $\vec{s}_i$ (i=1, a, b, c) that span Stokes space, where, $\vec{s}_1 = \hat{S}_1$, $\vec{s}_a = (a_1, a_2, a_3)$, $\vec{s}_b = (b_1, b_2, b_3)$, and $\vec{s}_c = (c_1, c_2, c_3)$, and measure the corresponding delays $\tau_{g1}$, $\tau_{ga}$, $\tau_{gb}$, and $\tau_{gc}$. We first express $\hat{S}_1$, $\hat{S}_2$, and $\hat{S}_3$ in terms of $\vec{s}_a$, $\vec{s}_b$, and $\vec{s}_c$, $$\hat{S}_i = \alpha_i \vec{s}_a + \beta_i \vec{s}_b + \gamma_i \vec{s}_c \ (i=1, 2, 3) \quad (15)$$

where the coefficients $\alpha_i$, $\beta_i$, and $\gamma_i$ are obtained from $$\begin{vmatrix} \alpha_1 & \beta_1 & \gamma_1 \\ \alpha_2 & \beta_2 & \gamma_2 \\ \alpha_3 & \beta_3 & \gamma_3 \end{vmatrix} = \begin{vmatrix} a_1 & a_2 & a_3 \\ b_1 & b_2 & b_3 \\ c_1 & c_2 & c_3 \end{vmatrix}^{-1} \quad (16)$$

Substituting $\hat{S}_i = \alpha_1 \vec{s}_a + \beta_1 \vec{s}_b + \gamma_1 \vec{s}_c$ into Eq. (14) gives $$\tan \omega_m(\tau_{g1} - \tau_0) = -\vec{q} \cdot (\alpha_1 \vec{s}_a + \beta_1 \vec{s}_b + \gamma_1 \vec{s}_c) \tan(\omega_m \Delta \tau / 2) \quad (17)$$

leading to a transcendental equation for $\tau_0$:

$$\tan \omega_m(\tau_{g1} - \tau_0) = \alpha_1 \tan \omega_m(\tau_{ga} - \tau_0) + \beta_1 \tan \omega_m(\tau_{gb} - \tau_0) + \gamma_1 \tan \omega_m(\tau_{gc} - \tau_0) \quad (18)$$

When solving for $\tau_0$, a first trial value for $\tau_0$ can be obtained by linearizing Eq. (18), $$\tau_0 = \frac{\tau_{gl} - \alpha_1 \tau_{ga} - \beta_1 \tau_{gb} - \gamma_1 \tau_{gc}}{1 - \alpha_1 - \beta_1 - \gamma_1}, \quad (19)$$

which is equivalent to the earlier eq. (13) for the exact solution of the pulse delay measurement.

Although the above procedure will yield any computational accuracy desired, it is often not necessary. For small modulation frequencies, ($\omega_m$, we can approximate $\tan(x) \approx x$ in Eq. (14), reducing to the earlier expressions (i.e. Eqs. (3) and (13)). These linear expressions are valid for sinusoidal modulation to within 6% as long as $\omega_m \Delta \tau < \pi/4$. For instance, for the peak DGD we observed here, 70 ps, 6% accuracy will be obtained for modulation frequencies, $f_m = \omega_m / 2\pi$, less than 1.8 GHz by using the linear expressions.

As above-explained, the inventive method involves multiple launchings of different polarized light states and determining the mean signal delays of the different polarization states. Basic techniques for measuring the group delay of an optical device are known, see, e.g., Y. Horiuchi, et al., "Chromatic Dispersion Measurements of 4564 km Optical Amplifier Repeater System," Electronics Letters, Vol. 29, pp. 4–5, Jan. 7, 1993. By comparing data taken at adjacent wavelengths, chromatic dispersion of optical devices can be accurately measured; such measurements being accurate even with the presence of PMD.

What is claimed is:

1. A method for measuring chromatic dispersion at an optical frequency of an optical device comprising:

launching, at an input of said device, first set of two test light signals at a first optical frequency and having polarization states that are orthogonal to one another, launching, at said input of said device, second set of two test light signals at a second optical frequency and having polarization states that are orthogonal to one another, measuring, at an output of said device, the mean signal delay of said first set and said second set of said two test light signals at each of said optical frequencies, and calculating the chromatic dispersion of said device, at a desired optical wavelength, as the change of the intrinsic group delay $\tau_0$ of said device with wavelength, said intrinsic group delay $\tau_0$ being a function of the measured mean signal delays.

2. A method according to claim 1 wherein the measuring of the mean signal delays is accomplished in approximation by measuring phase delays of sinusoidally modulated signals.

3. A method according to claim 1 wherein the calculation is based upon the formula $$\tau_0 = \frac{1}{2}(\tau_{gl} + \tau_{g(-1)})$$

where, for the test signals at each said optical frequency, $\tau_0$ is the intrinsic group delay and $\tau_{g1}$ and $\tau_{g(-1)}$ are the measured mean signal delays.

4. A method according to claim 3 wherein the measurements are made at two wavelengths, $\lambda_1$ and $\lambda_2$, and the chromatic dispersion, D, at the average of said two wavelengths, is obtained based upon the formula:

$$D[(\lambda_1 + \lambda_2)/2] = \frac{\tau_0(\lambda_2) - \tau_0(\lambda_1)}{\lambda_2 - \lambda_1}.$$

5. A method for measuring chromatic dispersion at a first optical frequency of an optical device comprising:

launching, at an input of said device, at a first optical frequency, four non-degenerate light signals $^PS_i$(i=1, a, b, c) that span Stokes space, launching, at said input of said device, at a second optical frequency, four non-degenerate light signals $^PS_i$(i=1, a, b, c) that span Stokes space, measuring, at an output of said device, the mean signal delay $\tau_{gi}$(i=1, a, b, c) of each of the non-degenerate light signals at each of said optical frequencies, and calculating the chromatic dispersion of said device as the change of the intrinsic group delay $\tau_0$ with wavelength, where the calculation is based upon the formula:

$$\tau_0 = \frac{\tau_{gl} - \alpha_1 \tau_{ga} - \beta_1 \tau_{gb} - \gamma_1 \tau_{gc}}{1 - \alpha_1 - \beta_1 - \gamma_1} \quad (13)$$

where the coefficients $\alpha_1$, $\beta_1$, and $\gamma_1$ are determined from the relations:

$$\alpha_1 = {^PS_1} \cdot ({^PS_b} \times {^PS_c})/({^PS_a} \cdot ({^PS_b} \times {^PS_c})) \quad (11a)$$

$$\beta_1 = {^PS_1} \cdot ({^PS_a} \times {^PS_c})/({^PS_b} \cdot ({^PS_a} \times {^PS_c})) \quad (11b)$$

$$\gamma_1 = {^PS_1} \cdot ({^PS_a} \times {^PS_b})/({^PS_c} \cdot ({^PS_a} \times {^PS_b})) \quad (11c).$$

6. A method according to claim 5 wherein the measurements are made at two wavelengths, $\lambda_1$ and $\lambda_2$, and the chromatic dispersion, D, at the average of said two wavelengths, is obtained based upon the formula:

$$D[(\lambda_1 + \lambda_2)/2] = \frac{\tau_0(\lambda_2) - \tau_0(\lambda_1)}{\lambda_2 - \lambda_1}.$$

7. A method for measuring chromatic dispersion at a first optical frequency of an optical device comprising:

launching, at an input of said device, at a first optical frequency, four non-degenerate, sinusoidal amplitude modulated, light signals $^PS_i$(i=1, a, b, c) that span Stokes space, launching, at said input of said device, at a second optical frequency, four non-degenerate, sinusoidal amplitude modulated, light signals $^PS_i$(i=1, a, b, c) that span Stokes space, where $^PS_1 = \hat{S}_1$, $^PS_a = (a_1, a_2, a_3)$, $^PS_b = (b_1, b_2, b_3)$, and $^PS_c = (c_1, c_2, c_3)$, measuring, at an output of said device, the mean signal delay $\tau_{gi}$(i=1, q, b, c), of each of the non-degenerate light signals at each of said optical frequencies, and calculating the chromatic dispersion of said device as the change of the intrinsic group delay $\tau_0$, with wavelength, where the calculation is based upon the formula:

$$\tan \omega_m(\tau_{g1} - \tau_0) = \alpha_1 \tan \omega_m(\tau_{ga} - \tau_0) + \beta_1 \tan \omega_m(\tau_{gb} - \tau_0) + \gamma_1 \tan \omega_m(\tau_{gc} - \tau_0)$$

where the coefficients $\alpha_1$, $\beta_1$, and $\gamma_1$ are determined from:

$$\begin{vmatrix} \alpha_1 & \beta_1 & \gamma_1 \\ \alpha_2 & \beta_2 & \gamma_2 \\ \alpha_3 & \beta_3 & \gamma_3 \end{vmatrix} = \begin{vmatrix} a_1 & a_2 & a_3 \\ b_1 & b_2 & b_3 \\ c_1 & c_2 & c_3 \end{vmatrix}^{-1}. \quad (16)$$

8. A method according to claim 7 wherein the measurements are made at two wavelengths, $\lambda_1$ and $\lambda_2$, and the chromatic dispersion, D, at the average of said two wavelengths, is obtained based upon the formula:

$$D[(\lambda_1 + \lambda_2)/2] = \frac{\tau_0(\lambda_2) - \tau_0(\lambda_1)}{\lambda_2 - \lambda_1}.$$

* * * * *